June 17, 1958
H. LOCKER
2,839,311
ADJUSTABLE WHEEL MOUNTING FOR TRAILERS
AND THE LIKE
Filed March 15, 1954
3 Sheets-Sheet 1
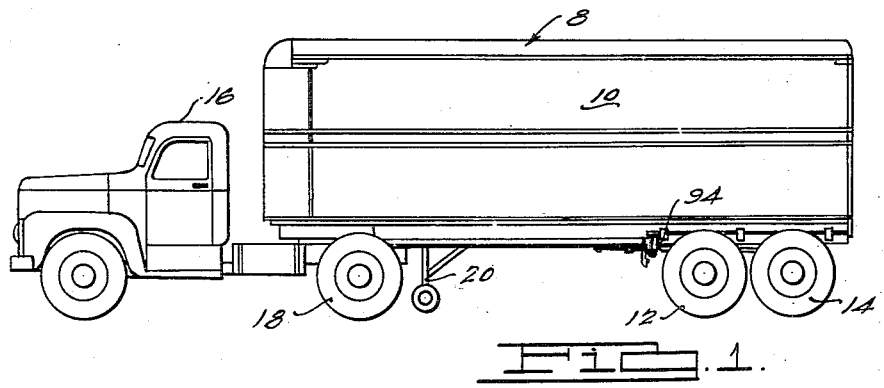
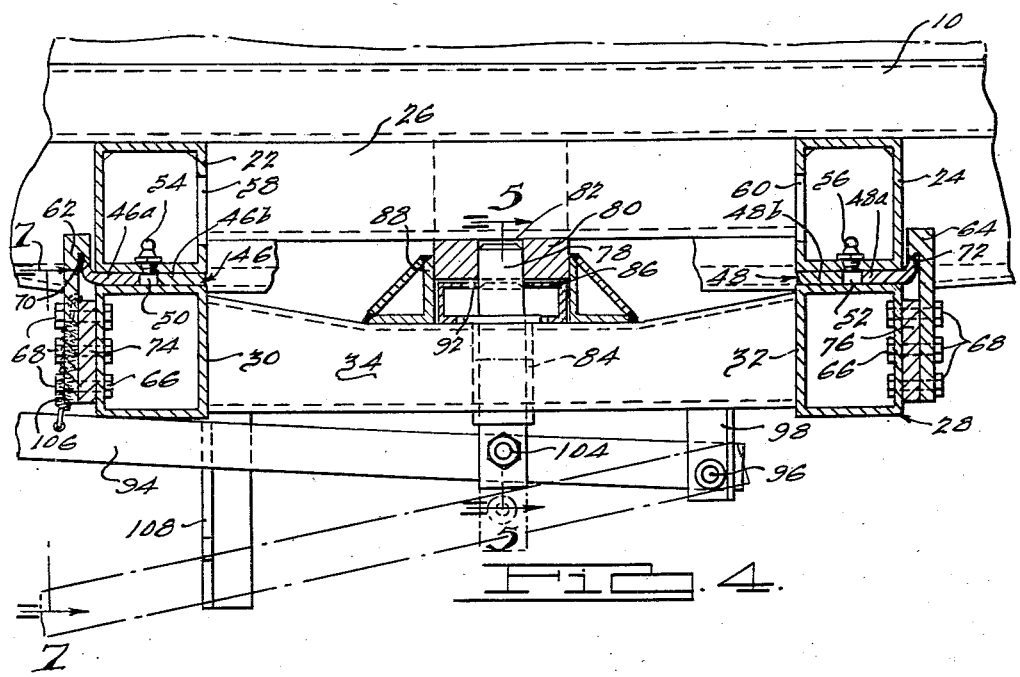
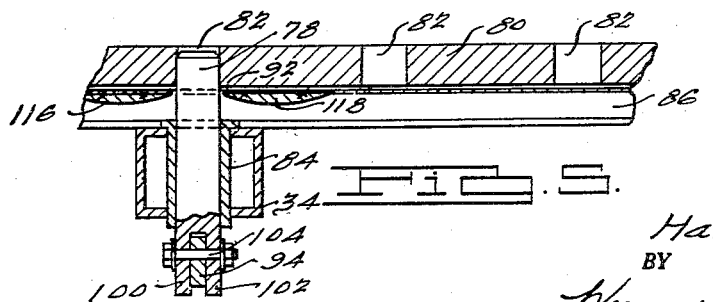
INVENTOR.
Hans Locker.
BY
Harness, Dickey & Pierce
ATTORNEYS.

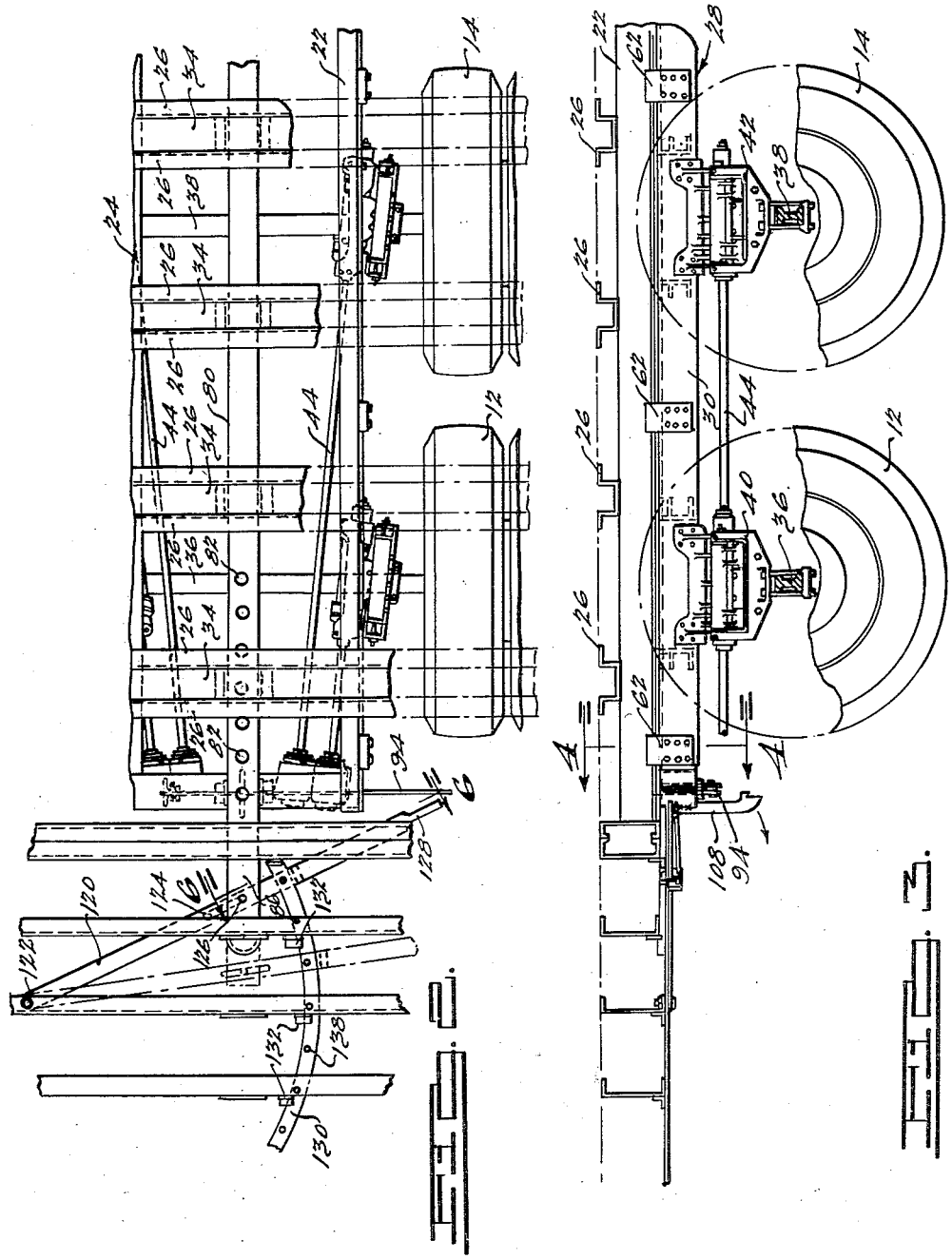

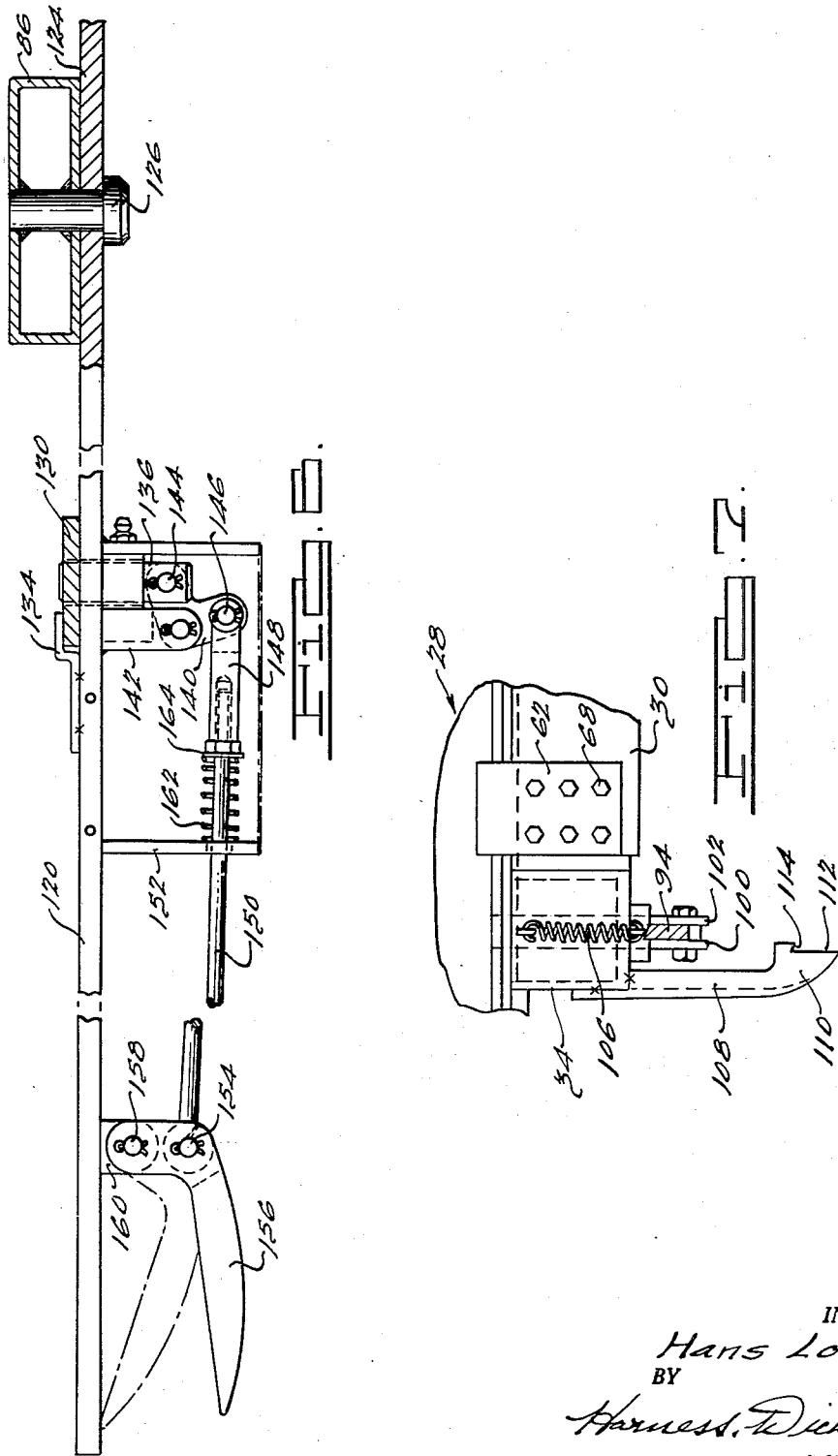

2,839,311

ADJUSTABLE WHEEL MOUNTING FOR TRAILERS AND THE LIKE

Hans Locker, Utica, Mich., assignor to Fruehauf Trailer Company, Detroit, Mich., a corporation of Michigan Application March 15, 1954, Serial No. 416,136

11 Claims. (Cl. 280—81)

This invention relates to new and useful improvements in trailers and more particularly to a novel wheel-mounting construction primarily adapted and pre-eminently suited for semitrailers.

Most States have regulations limiting the weight of freight-hauling trailers, and in the case of semitrailers these regulations frequently specify how the load should be distributed between the tractor and the trailer. Truckers entering such a State are directed to weighing-in stations where the load on the rear wheels of the tractor and the load on the trailer wheels are separately observed and recorded. These regulations are not uniform among the several States, and it frequently is not possible to load the trailer so as to comply with the regulations of all the States through which the trailer passes in the interstate journey. Accordingly, it has become necessary for the trailer manufacturers to provide some means for permitting the distribution of weight between the tractor and the trailer to be selectively varied. This can be done most conveniently by making the trailer wheels adjustable longitudinally of the trailer body. As the trailer wheels are moved forwardly under the trailer body the load is transferred progressively from the tractor wheels to the trailer wheels. Conversely, as the trailer wheels are moved rearwardly under the trailer body, a progressively geater portion of the load is transferred to the tractor. As it usually is necessary for the driver of a truck to make the adjustment on the job, it is desirable that the operation be performed as easily and quickly as possible and that it be essentially simple so that it can be performed by one man.

Heretofore, it has been the practice to fasten the wheel dolly detachably to the body subframe by a plurality of bolts and nuts. However, this expedient has not proved to be entirely satisfactory. The fastening means are of necessity in the undercarriage of the trailer where they are exposed to the elements and soon become crusted with dirt and grease. The bolts and nuts tend to become rusted in use so that they are difficult to remove. Also, the holes adapted to receive the bolts in the adjusted position of the dolly tend to become filled with dirt and the like so that they, as well as the adjacent supporting framepieces, must be cleaned before the adjustment can be made. In addition to the above, there is the problem of shifting the loaded trailer body relative to the dolly so that the holes in the trailer body frame members align properly with the holes of the dolly in the adjusted position. It will readily be appreciated that this is a difficult operation. Altogether a great deal of time and effort are required to make the adjustment on the road, and there is a need for a simpler, more efficient manner for making the adjustment.

An important object of the present invention is to provide a novel trailer construction wherein the load-supporting wheels of the trailer are adjustable longitudinally of the trailer body and wherein the adjustment can be made more easily and quickly than heretofore.

Another object of the invention is to provide a trailer of the above-mentioned character that is uniquely constructed so that the wheels can be adjusted relative to the trailer body by a single individual.

Still another object of the invention is to provide a trailer of the above-mentioned character having novel means for fastening the trailer body on the wheel dolly.

Other objects and advantages of the invention will be apparent during the course of the following description.

In the drawings forming a part of this specification and wherein like numerals are employed to designate like parts throughout the same:

Fig. 1 is a side elevational view of a semitrailer having an adjustable wheel dolly embodying the instant invention and showing the trailer operatively associated with a tractor;

Fig. 2 is a fragmentary top plan view showing the mechanism for adjusting the wheel dolly under the trailer body;

Fig. 3 is a side elevational view thereof;

Fig. 4 is an enlarged, transverse sectional view taken on the line 4—4 of Fig. 3;

Fig. 5 is a fragmentary, vertical sectional view taken on the line 5—5 of Fig. 4;

Fig. 6 is an enlarged, fragmentary, vertical sectional view taken on the line 6—6 of Fig. 2; and Fig. 7 is a fragmentary, vertical sectional view taken on the line 7—7 of Fig. 4.

In the drawings, wherein for the purpose of illustration is shown a preferred embodiment of the invention, the numeral 8 designates a semitrailer having a body 10 supported adjacent the rearward end thereof by a wheel dolly having ground-engaging tandem wheels 12 and 14. At its forward end, the trailer body 10 is adapted for detachable mounting on a tractor 16 in the conventional manner so that the forward freight load is supported by the rear wheels 18 of the tractor. It will be readily appreciated in this conection that trailers of the type usually are fastened to a tractor such as the one shown in the drawing by a fifth-wheel mounting, and since this structure comprises no part of the instant invention it is not shown in the drawings. The usual foldable prop 20 is provided adjacent the forward end of the trailer body for supporting the same when disengaged from the tractor 16.

According to the present invention, the tandem wheels 12 and 14 are part of a dolly subframe structure which is separate from the trailer body 10. Specifically, the trailer body 10 is formed with a suitable base frame comprising longitudinal and transverse structural members fixedly interconnected as by welding or the like. A pair of longitudinal frame members 22 and 24 are welded or otherwise fastened to the undersurface of the base frame so as to be in effect a part of the frame, and these members preferably are spaced equidistantly on opposite sides of the longitudinal center of the body. Transverse structural members 26 interconnect the longitudinal frame members 22 and 24 to suitably strengthen and reinforce the same. All of the structural members 22, 24, and 26 are here shown of hollow box shape in transverse section, but it will be readily appreciated that structural members of any suitable size or shape can be employed.

The dolly subframe designated generally by the numeral 28 comprises longitudinal frame members 30 and 32 rigidly interconnected by transverse structural members 34. Here again the frame members 30, 32, and 34 are shown of hollow box shape in transverse section, but it is contemplated that structural members of any suitable size or shape that will afford the necessary rigidity may be used. It is significant, however, that the longitudinal frame members 30 and 32 are spaced the same distance apart as the longitudinal body frame members 22 and 24 and that in use the subframe members 30 and 32 are disposed directly below respective frame members 22 and 24 so as to support the trailer body.

The subframe 28 may be of any suitable length. In a tandem wheel arrangement of the type here shown it is of course necessary that the subframe 28 be sufficiently long to accommodate the wheels and the wheel mountings. In any event, however, the subframe is substantially shorter than the trailer body and it preferably extends along a relatively short portion of the trailer base frame at the rear of the trailer body. The ground-engaging tandem wheels 12 and 14 are here shown mounted on axles 36 and 38 in the conventional manner, and the axles are fastened to the longitudinal subframe members 30 and 32 by the usual mountings 40 and 42 respectively. Conventional torsional tandem spring suspensions designated generally by the numeral 44 are provided for the wheels 12 and 14.

It is a feature of this invention that the trailer body 10 is supported on the subframe 28 by the longitudinal base frame members 22 and 24, and the arrangement is such that the body can be shifted back and forth on and relative to the subframe. To this end, wear plates 46 and 48 are interposed between the longitudinal base frame members 22 and 24 and the longitudinal subframe members 30 and 32. These wear plates are welded or otherwise fixedly attached to the upper frame members 22 and 24 and they preferably are sufficiently long to contact the subframe 28 fully in all adjusted positions thereof. When adjusting the ground-engaging wheels 12 and 14 relative to the trailer body the wear plates 46 and 48 actually slide back and forth on the longitudinal subframe members 30 and 32.

It is of some significance that the wear plates 46 and 48 are fastened to and carried by the upper frame members 22 and 24 rather than the subframe members 30 and 32. In a situation such as the one here presented where long structural members are supported on relatively short members and a substantial load is imposed thereon, there is a tendency for the relatively long members to arch or bow. This distorts the adjacent structure and produces fatigue in the members that may cause them to fail under conditions they otherwise could withstand with ease. However, in the instant construction the wear plates 46 and 48 strengthen and reinforce the frame members 22 and 24 so as to materially reduce, if not entirely eliminate, any tendency for these members to bow or arch on the subframe 28.

It will be observed that the wear plate 46 is formed in two parts, 46a and 46b, and that these parts are spaced laterally apart to define a longitudinal channel 50 therebetween. Similarly, the wear plate 48 is formed in two parts 48a and 48b which are spaced laterally apart to define an intermediate longitudinal channel 52. Grease fittings 54 and 56 carried by the base frame members 22 and 24 register with the channels 50 and 52 respectively and provide means for introducing a lubricant into the channels. If the channels 50 and 52 are maintained properly packed with lubricant the latter of course lubricates the contacting surfaces of the wear plates 46 and 48 and the longitudinal subframe members 30 and 32 to facilitate relative sliding movement therebetween. Access is had to the grease fittings 54 through openings 58 in the side of frame member 22, and access is had to the grease fittings 56 through openings 60 in the side of frame member 24.

In addition to the above, it is a feature of the invention that the wear plates 46 and 48 are utilized not only in the primary function described above but also as a means for fastening the trailer body to the subframe 28. To this end it will be observed that the wear plates 46 and 48 project laterally outwardly beyond the base frame members 22 and 24 and that the projecting portions of the wear plates are overlapped by retaining plates 62 and 64 respectively which are fastened to the subframe members 30 and 32 by bolts 66 and nuts 68. The retaining plates 62 and 64 are formed with inwardly extending, downwardly directed, longitudinal shoulders 70 and 72 which overlie the projecting marginal portions of the wear plates 46 and 48. By reason of such overlapping relation, the retaining plates 62 and 64 prevent the trailer body 10 from lifting off the subframe 28, and spacers 74 and 76 hold the retaining plates spaced slightly outwardly from the wear plates so as not to interfere with longitudinal sliding movement of the trailer body of the subframe.

In the preferred form, the projecting portions of the retaining plates 46 and 48 incline angularly outwardly and upwardly as shown in Fig. 4, and the overlying retaining shoulders 70 and 72 are correspondingly inclined. The main purpose of the retaining plates 62 and 64 is to prevent the trailer body from toppling sideways due to centrifugal forces created under certain conditions of operation as when the trailer rounds a curve at high speed. By reason of the inclined interfaces between the wear plates and the retainer plates any tendency for the trailer body to tip sideways on the dolly brings about a cam action between the plates which tends to force the overhanging portion of the retainer plate inwardly against the body frame member. In this manner any tendency to spread the retainer plates 62 and 64 or to spring them outwardly so that they disengage the wear plates is effectively prevented.

In operation, the usual practice is to set the brakes on the tandem wheels 12 and 14 and to then shift the body 10 forwardly or rearwardly on the dolly 28 according to the exigencies of the particular situation by means of the tractor 16. It will be readily appreciated, however, that it is not sufficient merely to change the position of the tandem wheels 12 and 14 under the trailer body. It is necessary also to provide means for positioning the wheels 12 and 14 in various adjusted positions and to provide means for holding the wheels in a particular adjusted position. As suggested above, the problems presented by these necessities have been most difficult of solution and means heretofore employed have been unsatisfactory.

According to the present invention, the trailer body 10 is fastened to the wheeled subframe 28 by a vertically movable pin 78 carried by and disposed centrally of one of the frame cross members 34 and a locator member or bar 80 welded or otherwise fastened securely to the base frame of the trailer body. As perhaps best shown in Fig. 4, the pin 78 extends upwardly into an opening 82 provided in the locator bar, and the interengagement thus established between the pin and the locator bar holds the body 10 securely against longitudinal sliding movement on the wheeled subframe 28. The pin 78 is slidably supported in a suitable bushing 84 so that it can be readily lowered to disengage the locator bar 80 when it is desired to change the position of the wheels 12 and 14 under the trailer body and raised into interlocking engagement with the locator bar to hold the wheels in the selected adjusted position.

As shown in Fig. 2 the locator bar 80 extends for a substantial distance longitudinally along the base frame of the trailer body 10, and a plurality of holes 82 are provided in longitudinal alignment and in substantially equispaced relation along the length of the bar. The pin 78 of course is engageable with any one of the holes 82 and it moves successively into register with the holes as the trailer body 10 is shifted back and forth on the subframe 28. By stopping the body 10 during any particular adjusting operation with the pin 78 in alignment with one of the holes 82 the body can be fastened securely to the subframe and against further sliding movement in either direction simply by inserting the pin 78 into the aligned hole. Thus the trailer body 10 is longitudinally adjustable on the wheeled dolly within limits defined by the holes 82 and the body can be fastened to the subframe in any of several increments of adjustment merely by positioning the body on the subframe with the pin 78 in alignment with a selected one of the holes 82 and then inserting the pin into the selected hole.

In order to enable the operator to position the body 10 easily and quickly on the dolly frame in any one of the several adjusted positions afforded by the latch bar 80, a slidable preselector bar 86 is provided directly under the locator bar 80. As perhaps best shown in Fig. 4, the preselector bar 86 fits loosely between the subframe cross members 34 and the preselector bar. Anglepieces 88 and 90 are mounted on and fastened to the subframe cross members 34 on opposite sides of the locator bar 80 and preselector bar 86. Thus, the locator bar 80 also functions as a guide in the way defined by anglepieces 88 and 90 to hold the trailer body properly centered on the subframe when the body is moved relative to the wheels. When serving in this capacity the bar 80 holds the body 10 centered properly on the dolly 28 and assists in preventing any lateral shifting of the body on the subframe. Also, the bar 80 maintains the pin 78 properly aligned with the holes 82. In addition to the above, the anglepieces 88 and 90 provide guides which hold the preselector bar 86 properly aligned under the locator bar 80.

The preselector bar 86 is relatively elongated and by reason of the loose fit of the bar with the surrounding parts it can be easily moved longitudinally back and forth relative to the locator bar 80 when the pin 78 is retracted. The bar 86 conveniently is made of relatively light-gauge metal and it is provided with a single hole 92 which moves progressively into register with the holes 82 when the bar 86 is moved in the manner described. It is preferred that the preselector bar 86 be sufficiently long to underlie all of the holes 82 in any adjusted position of the bar in which the opening 92 is in register with one of the holes 82. Even though the preselector bar 86 is not in pressed contact or engagement with the locator bar 80 it is effective to cover the holes 82 and thus prevent road dust from entering and plugging the holes. Manifestly the pin 78 can enter the holes 82 only through the opening 92 and it ineluctably follows therefore that the pin can enter only the single hole 82 that is in register with the opening 92. All of the other holes 82 are covered by the preselector bar 86.

Thus, in order to move the trailer body 10 a predetermined distance on the wheel subframe 28 it is merely necessary to disengage the pin 78 from the locator bar 80 to shift the preselector bar 86 a corresponding distance and into register with another one of the holes 82. This action closes the hole 82 previously engaged by the pin 78 and leaves only the hole exposed by the preselector bar in its adjusted position for reception of the pin. Further, the pin 78 cannot enter any of the holes 82 except the one exposed by the opening 92; and if the pin is pressed upwardly against the preselector bar while the trailer body is being adjusted on the subframe, the pin automatically enters the exposed hole when it moves into register therewith. As soon as the pin 78 enters the only available hole 82 the body 10 is fastened securely in the adjusted position to the subframe 28.

For convenience in operation it is desirable that the pin 78 be actuatable from the side of the trailer body. For this purpose, a transverse lever 94 is fulcrumed as at 96 to a depending bracket 98 on the subframe cross member 34 which carries the pin 78. The lever 94 extends laterally from the fulcrum 96 between clevis arms 100 and 102 provided on the lower end of the pin 78, and a pin 104 fastens the lever pivotally to the clevis arms. A spring 106 fastened to the lever 94 and to one of the subframe longitudinal members 30 holds the lever normally raised, as shown by full lines in Fig. 4. Thus the spring 106 also acts to hold the pin 78 normally raised and in one of the holes 82. Further, during adjustment of the body 10 on the subframe 28 the spring 106 holds the pin pressed upwardly against the preselector 86 so that it automatically enters the hole 82 aligned with the preselector opening 92 as soon as it moves into register with the hole.

As perhaps best shown in Fig. 1, the lever 94 extends laterally to the side of the body 10 directly ahead of the forward tandem wheel 12 where it is readily accessible for manual operation. To disengage the pin 78 from the locator bar 80 it is merely necessary to push the handle of the operating lever 94 downwardly against the action of spring 106 from the full-line to the broken-line position shown in Fig. 4. This operation disengages the pin 78 from both the locator 80 and the preselector 86 and permits the preselector to be moved either forwardly or rearwardly to the desired adjusted position. Then, when the lever 94 is released, the spring 106 presses the pin upwardly against the preselector 86 during the adjustment and causes it to snap into the hole 82 isolated by the preselector opening 92 as soon as the pin moves into alingment with the hole.

A latch 108 welded or otherwise fastened to and depending from the subframe 28 is adapted to be engaged by the lever 94 if desired to hold the pin 78 retracted and disengaged from both the locator 80 and the preselector 86. As perhaps best shown in Fig. 7 the latch 108 has a lateral, inwardly directed lower end portion 110 provided with a vertical face 112 and an overhanging shoulder 114. Both the face 112 and the shoulder 114 are disposed laterally of the lever 94 so that the latter will not engage the latch if moved vertically in the plane it normally occupies. However, the lever can be flexed laterally to engage the same under the shoulder 114, and if the lever is released when in this position the spring 106 holds it pressed upwardly against the shoulder. When the lever 94 is thus disposed, the shoulder 114 prevents it from returning to its normally raised position and holds the pin 78 retracted. If necessary or desirable, the shoulder 114 may be given a slight bevel and the upper edge of the lever 94 engaged thereby may be correspondingly beveled to effect an interlocking engagement therebetween which assists in preventing the handle from inadvertently springing laterally away from the latch and disengaging the shoulder.

Ribs 116 and 118 are provided on the undersurface of the locator 86 at opposite sides of the opening 92, and these ribs are formed with longitudinally arched undersurfaces (Fig. 5) defining cam means which engage the pin 78 as the body 10 approaches its final adjusted position on the subframe 28. As the pin 78 rides over the cam surface it is forced downwardly and thus rocks the operating lever 94 downwardly. As the lever 94 is depressed it disengages the shoulder 114 and the inherent resiliency of the lever immediately causes it to spring laterally out from under the shoulder. This action disengages the lever 94 from the latch 108 and permits the spring 106 to engage the pin 78 automatically in the hole 82 in the manner hereinabove described.

The advantage of the latch 108 is that the operator can disengage the pin 78 from the locator 80 and hold it disengaged while shifting the preselector 86. Then, after the preselector has been properly positioned the operator can get in the cab of the tractor 16 and shift the trailer body back or forth as required to obtain the desired adjustment. The pin 78 is held retracted until near the end of the adjusting movement when it is disengaged automatically from the latch 108 by one or the other of the cams 116 and 118 so that it automatically enters the hole 82 to again connect the body 10 to the subframe 28 when the adjustment has been completed.

It also is desirable to provide means permitting the preselector 86 to be moved conveniently from one side of the trailer body. To this end a manually operable lever 120 is pivoted as at 122 to the base frame of the trailer body.

The lever 120 extends from the pivot 122 under the forward end of the preselector 86 and is provided with an elongated slot 124 which receives a pin 126 carried by and depending from the preselector. From the preselector 86 the lever 120 extends to a position adjacent the side of the body 10 and the distal end thereof is formed to provide a handle 128. It is a feature of the invention that the handle 128 is disposed in proximity to the pin-operating lever 94 so that both of the levers 94 and 120 can be conveniently operated by a single individual. The preselector 86 of course can be moved whenever it is released by the pin 78, and movement thereof is effected simply by swinging the operating lever 120 about the pivot 122 (Fig. 2).

The lever 120 is supported outwardly of the preselector 86 by an arcuately curved latch bar 130 which is conveniently fastened to the base frame of the trailer body 10 by mounting brackets 132. As shown in Fig. 2, the mounting brackets 132 are arranged so as to leave the outer edge of the bar 130 unobstructed, and an offset retainer 134 fastened to the lever 120 overlies the outer marginal portion of the latch bar (Fig. 6). The latch bar 130 is concentric to pivot 122 so that the retainer 134 remains engaged therewith in all adjusted positions of the lever 120.

Means is provided also for detachably fastening the lever 120 to the latch bar 130 at spaced points corresponding to registration of the preselector opening 92 with each of the locator holes 82. In the form of the invention shown, this means comprises a latch pin 136 carried by the lever 120 and holes 138 in the latch bar 130 disposed to receive the latch pin. A pivoted bell crank 140 carried by a supporting bracket 142 on the lever 120 has one arm thereof pivoted to the pin 136 as at 144. The other arm of the bell crank 140 is connected by a pivot 146 to a clevis 148 on the end of an actuating rod 150. The latter is slidable in a support 152 also carried by the lever 120 and the outer end thereof is fastened by a pivot 154 to an operating handle 156. The handle 156 here shown is generally in the form of a bell crank and the rod 150 is fastened thereto at substantially the juncture of the crank arms. As perhaps best shown in Fig. 6, one crank arm of the handle 156 is fastened by a pivot 158 to a supporting bracket 160 on the undersurface of the lever 120 and the other crank arm thereof extends outwardly for manual operation thereof.

A spring 162 on the rod 150 and confined between the support 152 and a washer 164 acts through the bell crank 140 to hold the latch pin 136 normally engaged with the latch bar 130. However, the handle 156 can be moved from the full-line to the broken-line position in Fig. 6 to disengage the pin 136 from the latch bar. As suggested, a hole 138 is provided in the latch bar for each of the holes 82 in the locator bar 80, and the holes 138 are spaced so that the latch pin 136 aligns with one of the holes 138 each time the preselector opening 92 moves into register with one of the locator holes 82. Thus, the operator knows that when the latch pin 136 is engaged with the latch bar 130, the preselector opening 92 is in register with one of the locator holes 82 and he can tell by the position of the lever 120 which of the holes 82 is exposed by the preselector opening 92. If necessary or desirable, suitable indicia (not shown) can be provided in any suitably convenient location as on the latch bar 130 or on the body of the trailer 10 to assist the operator in correlating the position of the lever 120 and the particular adjusted position of the preselector 86.

It may thus be seen that I have achieved the objects of my invention. I have provided a mechanism which permits the rear supporting wheels of a trailer to be shifted easily and quickly relative to the trailer body in accordance with the exigencies of the particular situation. The mechanism is strong and rugged and is relatively unaffected adversely by weather or road conditions to which it is exposed in use. It can be operated easily and quickly by a single individual, and the operator can make the adjustment with ease and dispatch.

Having thus described the invention, I claim:

1. A trailer comprising a wheeled subframe having longitudinal ways, a trailer body having longitudinal members supported by and movable on said ways, a locator member fixed to and movable with the body provided with longitudinally spaced holes therein, a movable pin carried by said subframe selectively engageable in said holes to fasten said body to the subframe and retractable therefrom to disengage said body from said subframe, and a preselector interposed between said locator member and said subframe slidable relative to said locator member and said pin and having an opening disposed to register successively and individually with said holes when the preselector is moved back and forth relative to said member, said preselector being adjustable when said pin is retracted to bring said opening into register with a selected one of said holes and operative when so positioned to prevent entry of said pin into any of said holes except the one aligned with said opening and thus to determine the position of the subframe longitudinally of said trailer body.

2. A trailer comprising a wheeled subframe having longitudinal ways, a trailer body having longitudinal frame members supported by and movable on said ways, a longitudinal locator member fixed to and movable with the body provided with longitudinally spaced holes therein, a locating pin carried by said subframe movable into and out of engagement with said holes to fasten the body to said subframe, a slidably mounted preselector bar interposed between said locator member and said subframe movable relative to said locator member and said locating pin and having an opening disposed to register successively with said holes when the bar is moved back and forth relative to said member, and a manually operable actuator connected to said preselector bar for slidably adjusting the same to position said opening in register with a selected one of said holes, said preselector bar blocking off all of said holes but one to entry of said locating pin and determining by its particular adjusted position relative to said locator member the position of said subframe longitudinally of said trailer body.

3. A trailer comprising a wheeled subframe having longitudinal ways, a trailer body having longitudinal frame members supported by and movable on said ways, a longitudinal locator member fixed to and movable with the body provided with longitudinally spaced holes therein, a vertically movable locating pin fastened securely to said subframe and selectively engageable in said holes to fasten the body to the subframe, a slidably mounted preselector body interposed between said locator member and said subframe movable relative to said locator member and said locating pin and having an opening disposed to register successively with a selected one of said holes when the body is moved back and forth relative to said member, a manually operable actuator connected to said pin for moving the same into and out of engagement with said locator member, a manually operable actuator connected to said preselector body for slidably adjusting the same to position said opening in register with a selected one of the holes in said locator member, both of said actuators disposed adjacent each other for convenient operation by a single individual.

4. A trailer comprising a wheeled subframe having longitudinal ways, a trailer body having longitudinal frame members supported by and movable on said ways, a longitudinal locator member fixed to and movable with the body provided with longitudinally spaced holes therein, a slidably mounted preselector bar under said locator member having an opening disposed to register successively with said holes when the bar is moved back and forth relative to said member, a vertically movable locating pin fastened securely to said subframe and selectively engageable in said holes through said opening to fasten the body to the subframe, a manually operable actuator connected to said pin for moving the same into and out of engagement with said locator member, a manually operable actuator connected to said preselector bar for slidably adjusting the same to position said opening in register with a selected one of the holes in said locator member, both of said actuators including handles extending transversely of the trailer and accessible for convenient manual operation from the side of the trailer.

5. A trailer comprising a wheeled subframe having longitudinal ways, a trailer body having longitudinal frame members supported by and movable on said ways, a longitudinal locator member fixed to and movable with the body provided with longitudinally spaced holes therein, a vertically movable locating pin journaled in said subframe and selectively engageable in said holes to fasten said body to said subframe, means for actuating said locating pin and for holding it normally engaged with the locator member, a slidably mounted preselector bar interposed between said locator member and said subframe having a single opening disposed to register successively with said holes when the bar is moved back and forth relative to said preselector member, a pivoted operating lever fastened to said preselector bar by a pin and slot connection adapted to actuate said bar to move said opening into register with a selected one of said holes, a latch bar fastened to the trailer traversed by said lever during pivotal movement thereof, and a manually operable latch means on the lever and latch bar adapted to interlockingly engage when said preselector bar is positioned with the opening therein in register with each of the holes in said locator member to hold said bar in each of said positions.

6. A trailer comprising a wheeled subframe having longitudinal ways, a trailer body having longitudinal frame members supported by and movable on said ways, a longitudinal locator member fixed to and movable with the body provided with longitudinally spaced vertical holes therein, a slidably mounted preselector bar under said locator member having a single vertical opening disposed to register successively with said holes when the bar is moved back and forth relative to said member and adapted to block off all of the holes except the one which is in register with said opening, and a vertically movable pin carried by said subframe and movable relative to said preselector bar and into a selected one of said holes through said opening to fasten the body to the subframe, whereby the position of said subframe longitudinally of said trailer body can be adjusted by retracting said pin, shifting said preselector bar to position the opening therein in register with a selected one of said holes, then shifting the trailer body on said subframe until the pin is positioned to enter said selected hole, and then inserting the pin into said hole to fasten the trailer body to the subframe in the selected adjusted position.

7. A trailer comprising a wheeled subframe having longitudinal ways, a trailer body having longitudinal frame members supported by and movable on said ways, a longitudinal locator member fixed to and movable with the body provided with longitudinally spaced holes therein, a preselector bar on and slidably movable relative to said locator member having an opening therein disposed to register successively with said holes when the bar is moved back and forth relative to said member, an axially movable pin carried by said subframe positioned to enter a selected one of said holes through said opening to fasten the body to said subframe, spring means coacting with said pin to urge the same in the direction of said locator member and in a selected one of said holes, a pivoted lever connected to the pin for disengaging the same from said locator member against the action of said spring means, a latch member positioned to engage said lever when the pin is fully retracted from said locator member for holding said pin in the retracted position, and means for disengaging said lever automatically from said latch as the pin approaches the opening in said preselector bar.

8. A trailer comprising a wheeled subframe having longitudinal ways, a trailer body having longitudinal frame members supported by and movable on said ways, a longitudinal locator member fixed to and movable with the body provided with longitudinally spaced holes therein, a preselector bar on and slidably movable relative to said locator member having an opening therein disposed to register successively with said holes when the bar is moved back and forth relative to said member, a vertically movable pin carried by said subframe positioned to enter a selected one of said holes through said opening to fasten the body to said subframe, spring means coacting with said pin to urge the same in the direction of said locator member and in a selected one of said holes, a pivoted lever connected to the pin for disengaging the same from said locator member against the action of said spring means, a catch positioned to engage said lever when the pin is fully retracted from said locator member for holding said pin in the retracted position, said catch being offset laterally with respect to said lever so that the latter must be flexed to one side in order to engage the same with said catch, and cam means on said preselector bar adjacent said opening engageable with said pin as the latter moves into register with said opening and operable by such engagement to actuate the pin and the lever connected thereto so as to release said lever from said catch and to permit said spring means to engage the pin with said locator member immediately when the opening in said preselector bar moves fully into register with said pin.

9. A trailer comprising a subframe having longitudinal ways, ground-engaging wheels supporting said subframe, a trailer body having longitudinal frame members on said ways, said body being slidable back and forth on said subframe to vary the position of said ground-engaging wheels longitudinally thereof and thus the portion of the trailer load carried by said wheels, and means for fastening the subframe to the trailer body in different adjusted positions including a locator on and movable with the trailer body having a plurality of longitudinally spaced holes therein, a preselector having a single opening movable relative to said locator selectively into register with individual holes in said locator, a pin carried by said subframe movable with said subframe and relative to said preselector, said pin being slidable into a selected one of said holes through the opening in said preselector to fasten the trailer body to said subframe, resilient means coactive with said pin to hold the same normally engaged in a selected one of said holes, and a manual actuator for retracting the pin to disengage said locator against the action of said spring, said preselector being movable when the pin is retracted to position said opening in register with any selected one of said holes, and said pin being operable to again connect the subframe to the trailer by shifting the trailer body on the subframe in a direction to move the opening in said preselector and the hole aligned therewith again into register with said pin.

10. A trailer comprising a wheeled frame having longitudinal ways, a trailer body having a base frame supported by and movable on said ways, and means detachably interconnecting said frames including a locator connected to one of said frames and provided with a series of longitudinally spaced holes, a pin carried by the other of said frames and movable into and out of engagement with a selected one of said holes, said trailer body being longitudinally adjustable on said wheeled frame and said pin being interengageable with a selected individual one of said holes to detachably fasten said wheeled frame to the trailer body in the selected adjusted position, and a preselector adapted to close off all of said holes but one, said preselector having a single opening therein and being movable relative to both said locator and said pin when the pin is disengaged from said locator to position said opening in register with a selected one of said holes, whereby to isolate a single one of said holes for engagement with said pin and to provide a single adjusted position of the trailer frame on said wheeled frame in which said pin is operative to interconnect said frames.

11. A trailer comprising a wheeled subframe having longitudinal frame members defining ways, a trailer body having a base frame including longitudinal frame members on and supported by said ways, wear plates interposed between said subframe and said trailer body fastened to and projecting laterally of one of said frame members and supporting the said trailer body for longitudinal sliding movement on said subframe, retaining plates fastened to the other of said frame members overlapping the projecting portions of said wear plates to hold said trailer body on said subframe, a longitudinal locator fixed to one of said frames and provided with longitudinally spaced holes, a slidably mounted preselector on said locator movable relative to said locator and having an opening disposed to register successively and individually with said holes, and a movable pin on the frame not carrying said locator movable with said frame relative to said locator and said preselector and selectively engageable in said holes through said opening to fasten the trailer body to the subframe.

References Cited in the file of this patent

UNITED STATES PATENTS

| | | |
|---|---|---|
| 1,265,705 | Litchfield | May 7, 1918 |
| 1,621,555 | Miller | Mar. 22, 1927 |
| 2,196,338 | McDaniel | Apr. 9, 1940 |
| 2,268,167 | Raine | Dec. 30, 1941 |
| 2,332,326 | Lex | Oct. 19, 1943 |
| 2,365,884 | Kucera | Dec. 26, 1944 |
| 2,606,769 | DeLay | Aug. 12, 1952 |
| 2,676,815 | Bennett | Apr. 27, 1954 |
| 2,682,419 | Wolf | June 29, 1954 |

FOREIGN PATENTS

| | | |
|---|---|---|
| 584,416 | Great Britain | Jan. 14, 1947 |